(12) United States Patent
Roth et al.

(10) Patent No.: US 7,465,169 B2
(45) Date of Patent: Dec. 16, 2008

(54) MOLECULAR MODELS

(75) Inventors: Eatai Roth, Pittsburgh, PA (US); Anne-Marie L. Nickel, Wauwatosa, WI (US); Timothy M. Herman, Wauwatosa, WI (US)

(73) Assignee: Milwaukee School of Engineering, Milwaukee, WI (US)

( * ) Notice: Subject to any disclaimer, the term of this patent is extended or adjusted under 35 U.S.C. 154(b) by 0 days.

(21) Appl. No.: 11/089,430

(22) Filed: Mar. 24, 2005

(65) Prior Publication Data

US 2005/0227213 A1 Oct. 13, 2005

Related U.S. Application Data

(60) Provisional application No. 60/557,425, filed on Mar. 28, 2004.

(51) Int. Cl.
*G09B 23/26* (2006.01)
(52) U.S. Cl. .................................................. 434/278
(58) Field of Classification Search ............... 434/276, 434/278, 281, 283, 298, 300; 446/92, 129, 446/133, 134, 135, 137, 138
See application file for complete search history.

(56) References Cited

U.S. PATENT DOCUMENTS

| | | | |
|---|---|---|---|
| 2,308,402 A | 1/1943 | Taylor | |
| 3,183,608 A * | 5/1965 | Jierree | .................. 434/278 |
| 3,406,972 A * | 10/1968 | Wong | .................. 273/118 A |
| 3,594,924 A | 7/1971 | Baker | |
| 3,604,130 A * | 9/1971 | Forsstrom | .................. 434/278 |
| 3,841,001 A * | 10/1974 | Nicholson | .................. 434/278 |
| 3,854,223 A | 12/1974 | Dingman, II | |
| 3,939,581 A | 2/1976 | Clarke, Jr. | |
| 4,020,566 A | 5/1977 | Dreiding | |
| 4,030,209 A * | 6/1977 | Dreiding | .................. 434/278 |
| 4,099,339 A | 7/1978 | Snelson | |
| 4,192,084 A | 3/1980 | O'Riordan | |
| 4,325,698 A | 4/1982 | Darling et al. | |
| 4,348,190 A | 9/1982 | Barrett | |
| 4,622,014 A * | 11/1986 | Mikelsaar | .................. 434/278 |
| 4,877,406 A * | 10/1989 | Wilk | .................. 434/278 |
| 4,906,122 A | 3/1990 | Barrett et al. | |
| 5,029,304 A | 7/1991 | Tolmie, Jr. | |
| 5,030,103 A | 7/1991 | Buist et al. | |
| 5,048,704 A * | 9/1991 | Takahashi | .................. 213/75 D |
| 5,347,253 A * | 9/1994 | Ogikubo | .................. 335/302 |
| 5,362,271 A * | 11/1994 | Butt | .................. 446/139 |
| 5,430,537 A | 7/1995 | Liessner et al. | |
| 5,746,638 A * | 5/1998 | Shiraishi | .................. 446/92 |
| 5,880,683 A | 3/1999 | Brandestini | |
| 5,921,781 A * | 7/1999 | Shaw | .................. 434/298 |
| 5,947,745 A * | 9/1999 | Tempelman | .................. 434/278 |
| 5,965,879 A | 10/1999 | Leviton | |

(Continued)

*Primary Examiner*—Kurt Fernstrom
(74) *Attorney, Agent, or Firm*—Michael Best & Friedrich LLP (57) ABSTRACT

A molecular modeling kit including a three-dimensional body providing a physical representation of at least one atom. The three-dimensional body can define a cavity and include a self-reorienting magnet at least partially disposed in the cavity. The magnet can be configured to realign relative to the cavity when in proximity with a second magnet such that magnetic poles of the self-reorienting magnet and the second magnet are aligned for attraction. The second magnet can be external to the three-dimensional body.

26 Claims, 10 Drawing Sheets

U.S. PATENT DOCUMENTS

| | | |
|---|---|---|
| 6,017,220 A | 1/2000 | Snelson |
| 6,147,342 A | 11/2000 | Kucher |
| 6,508,652 B1 | 1/2003 | Kestyn |
| 6,749,480 B1 * | 6/2004 | Hunts .......................... 446/92 |
| 6,884,079 B2 * | 4/2005 | Takamatsu ................... 434/278 |
| 2001/0021619 A1 * | 9/2001 | Forkman .................... 446/129 |
| 2005/0112988 A1 * | 5/2005 | Whitehead ................... 446/137 |
| 2006/0099877 A1 * | 5/2006 | Anderson ..................... 446/92 |

* cited by examiner

MOLECULAR MODELS

RELATED APPLICATIONS

This application claims the benefit of the filing date of U.S. Provisional Patent Application No. 60/557,425 filed on Mar. 28, 2004.

BACKGROUND OF THE INVENTION

The invention relates to molecular models, and more specifically to three-dimensional molecular models.

A number of different types of molecular models are known and used to represent molecular structures. Often, ball-and-stick molecular models are utilized to represent three-dimensional physical models of molecular structures. Ball-and-stick molecular models generally use spheroids (i.e., balls) to represent atoms, and rigid or flexible connectors (i.e., sticks) to represent bonds. Combinations of balls and sticks can be combined to construct molecule structures of varying complexity. Some examples of ball-and-stick molecular models are disclosed in U.S. Pat. Nos. 5,030,103; 4,348,190; 4,325,698; 4,099,339; 4,030,209; 4,020,566; and 3,939,581.

SUMMARY OF THE INVENTION

Although molecular modeling kits are available to build physical representations of a wide variety of molecular structures, existing molecular modeling kits generally require the forcible connection of external pieces that represent bonds and spheroids that represent atoms. However, bonding is intrinsic to the atoms participating in the bonds. Therefore, the use of external pieces to connect atoms can lead to misconceptions about molecular structures. For example, individuals using existing molecular modeling kits may develop the misconception that bonds and atoms are distinctly separate elements of a molecular structure. Further, individuals using existing molecular modeling kits may develop the misconception that, similar to the assembly of the molecular model, energy is consumed when forming bonds between atoms.

Compatible atoms generally spontaneously interact with each other to form bonds. Energy is generally released during formation of the bonds between compatible atoms. Further, the bonds generally have a specific geometry. As compatible atoms bond together, molecular structures are formed.

A more accurate understanding of the energetics of molecular self-assembly is becoming increasing important as the molecular sciences continue to expand and careers in the molecular biosciences and material sciences are increasingly focused on nanotechnology and a deeper understanding of the mechanism of biomolecular reactions. The spontaneous assembly of atoms into higher order structures according to basic laws of chemistry is an important element of this understanding.

Accordingly, the invention provides molecular modeling kits that exhibit the property of spontaneous self-assembly of atoms and/or groups of atoms. Individuals using the molecular modeling kits can develop an intuitive appreciation for the spontaneous nature of molecular assembly. Each molecular modeling kit includes a plurality of three-dimensional bodies. Each three-dimensional body can represent a single atom or a group of atoms. Instead of using external pieces to connect the three-dimensional bodies, the three-dimensional bodies can include internal fasteners that allow the three-dimensional bodies to serve as the only building component for the molecular modeling kits.

The internal fasteners can comprise at least one self-reorienting magnet. Each self-reorienting magnet can be positioned at least partially in a cavity of the three-dimensional body to realign its magnetic poles when in proximity with a magnet (e.g., another self-reorienting magnet, a simple magnet such as a stationary magnet, and the like) of another three-dimensional body such that the magnetic poles of the magnets align for attraction. Attraction of the magnets generally results in spontaneous connection of compatible three-dimensional bodies with accurate bond geometry. In some constructions, an external surface of the three-dimensional body can affect the bond geometry represented by the connected three-dimensional bodies.

In some constructions, self-reorienting magnets form a portion of a self-reorienting arrangement of magnets (SRAM). A SRAM can include at least one self-reorienting magnet in each of two compatible three-dimensional bodies. The SRAM can employ magnets that flip to realign, magnets the spin to realign, magnets that alternatively move to realign, and/or a combination thereof.

The molecular modeling kits according to the invention provide a hands-on tool that allows tactile learners to appreciate the complexity of various molecular structures in a way that prior molecular models have not.

Further aspects of the invention together with the organization and manner of operation thereof will become apparent from the following detailed description of the invention when taken in conjunction with the accompanying drawings wherein like elements have like numerals throughout the drawings.

BRIEF DESCRIPTION OF THE DRAWINGS

The invention is further described with reference to the accompanying drawings which show embodiments of the invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the invention. Also, it should be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DESCRIPTION OF THE INVENTION

Figure 1:
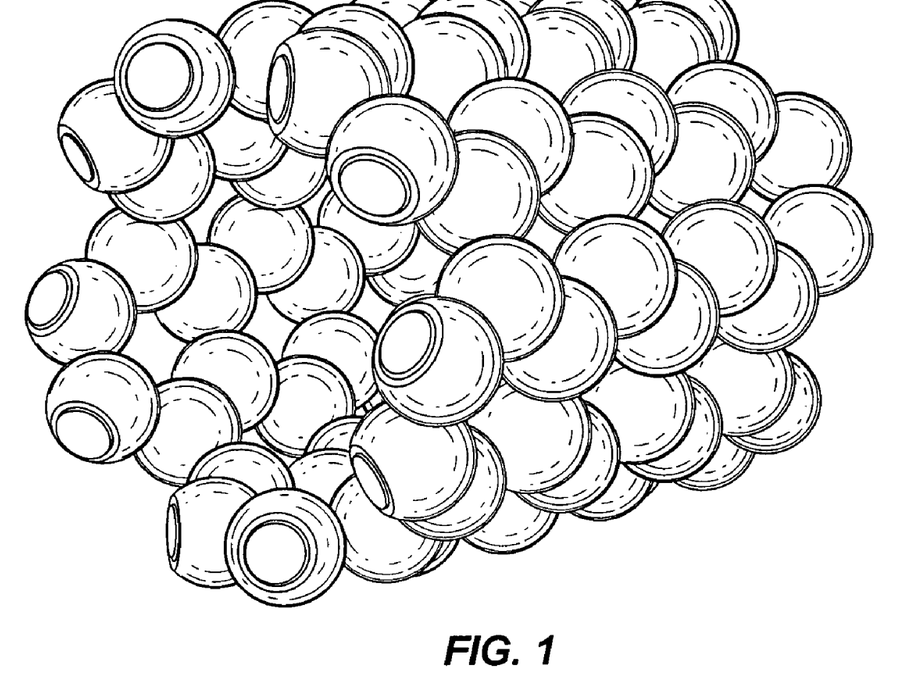
FIG. 1 illustrates a carbon nanotube molecular model that incorporates aspects of the invention.
Figure 2:
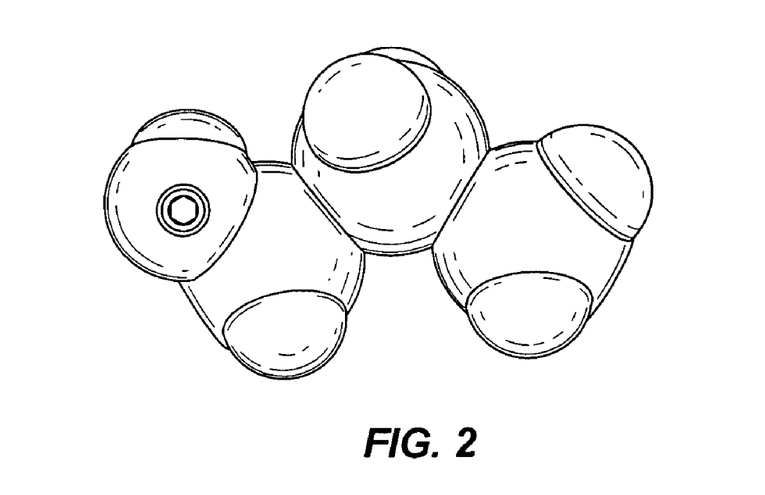
FIG. 2 illustrates a propanol molecular model that incorporates aspects of the invention.
Figure 3:
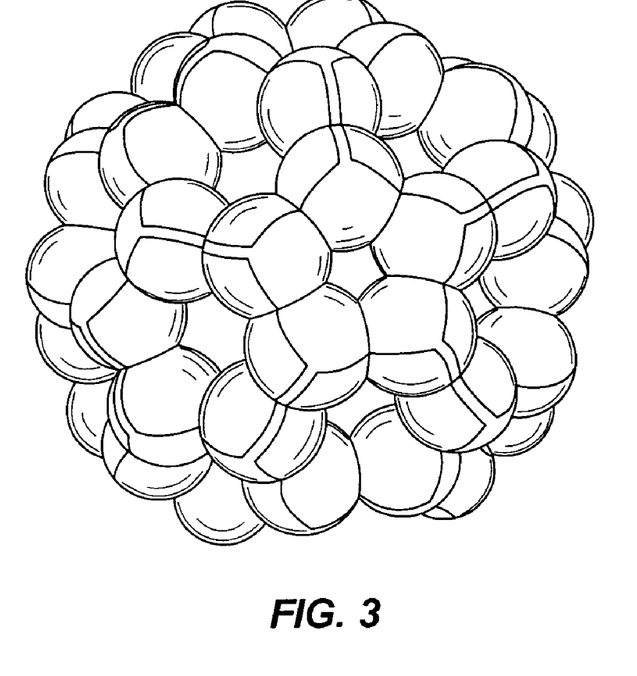
FIG. 3 illustrates a buckyball molecular model that incorporates aspects of the invention.
Figure 4:
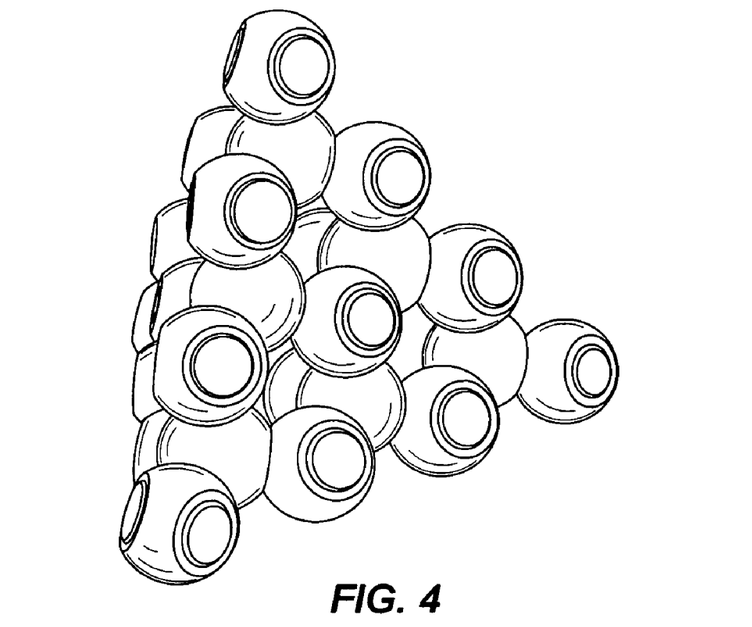
FIG. 4 illustrates a diamond molecular model that incorporates aspects of the invention.
Figure 5:
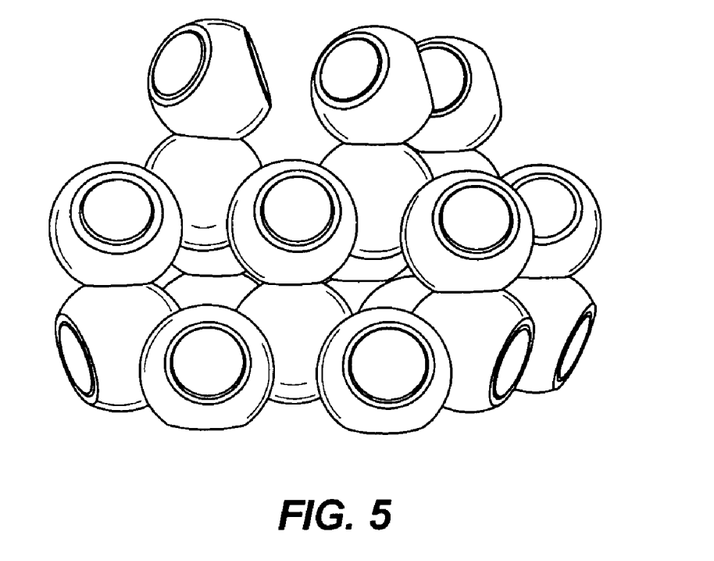
FIG. 5 illustrates a diamond molecular model that incorporates aspects of the invention.
Figure 6:
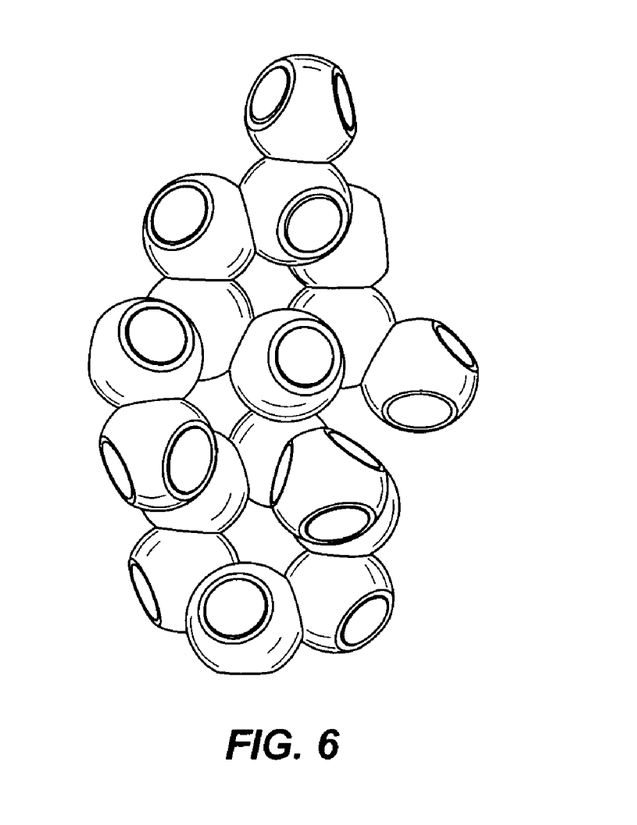
FIG. 6 illustrates a diamond molecular model that incorporates aspects of the invention.
Figure 7:
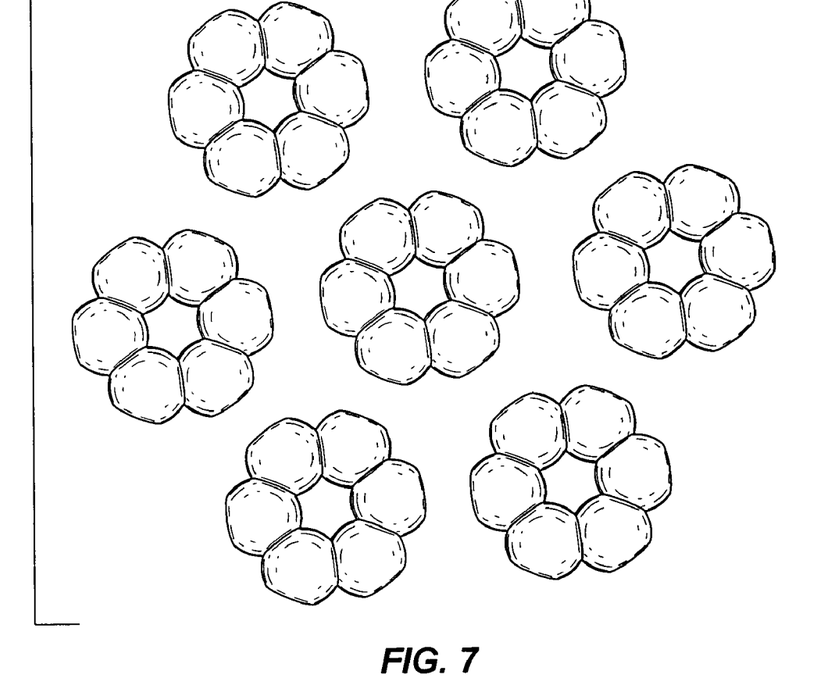
FIG. 7 illustrates graphene sheet molecular models that incorporate aspects of the invention.
Figure 8:
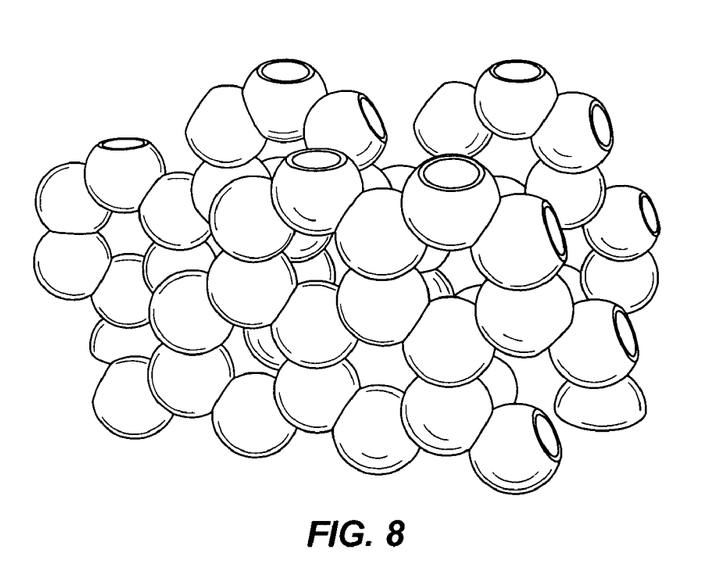
FIG. 8 illustrates a graphite molecular model that incorporates aspects of the invention.
Figure 9:
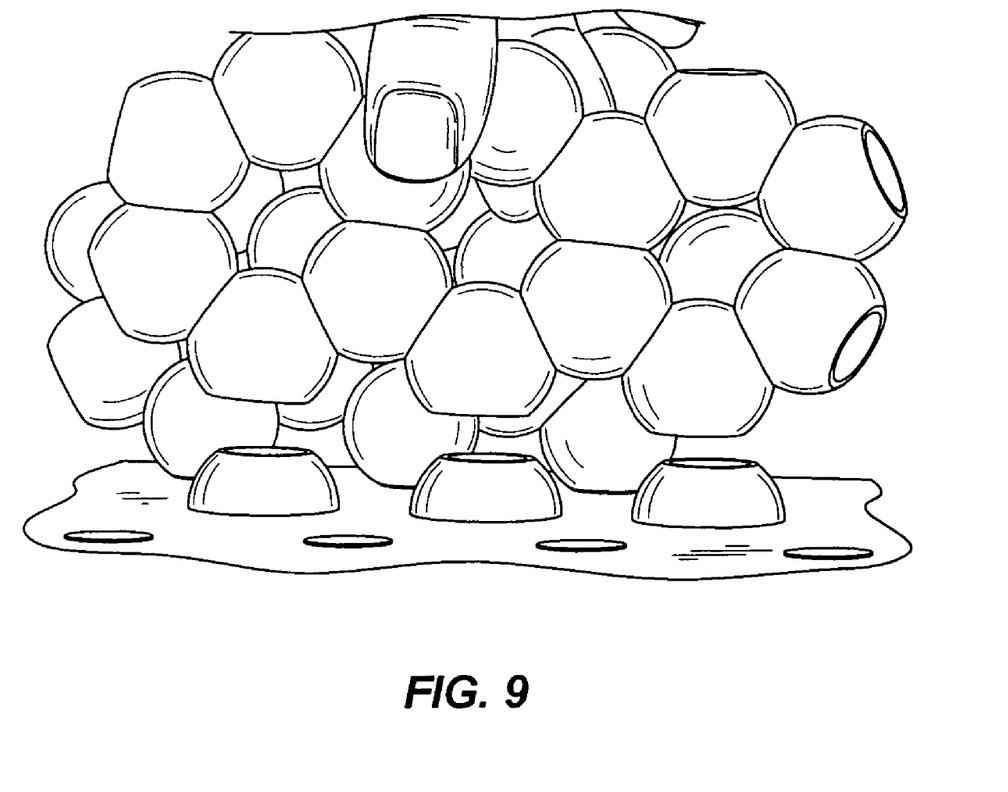
FIG. 9 illustrates a graphite molecular model that incorporates aspects of the invention.

FIGS. 1-9 illustrate molecular models formed using molecular modeling kits that incorporate aspects of the invention. More specifically, FIG. 1 illustrates a carbon nanotube molecular model; FIG. 2 illustrates a propanol molecular model; FIG. 3 illustrates a buckyball, or buckminsterfullerene, molecular model; FIGS. 4-6 illustrate diamond molecular models; FIG. 7 illustrates graphene sheet molecular models; and FIGS. 8 and 9 illustrate graphite molecular models. Although the invention is described herein with respect to the molecular models illustrated in FIGS. 1-9, it should be understood that the invention is applicable to a wide variety of molecules and crystalline materials of varying size and complexity.

Figure 18:
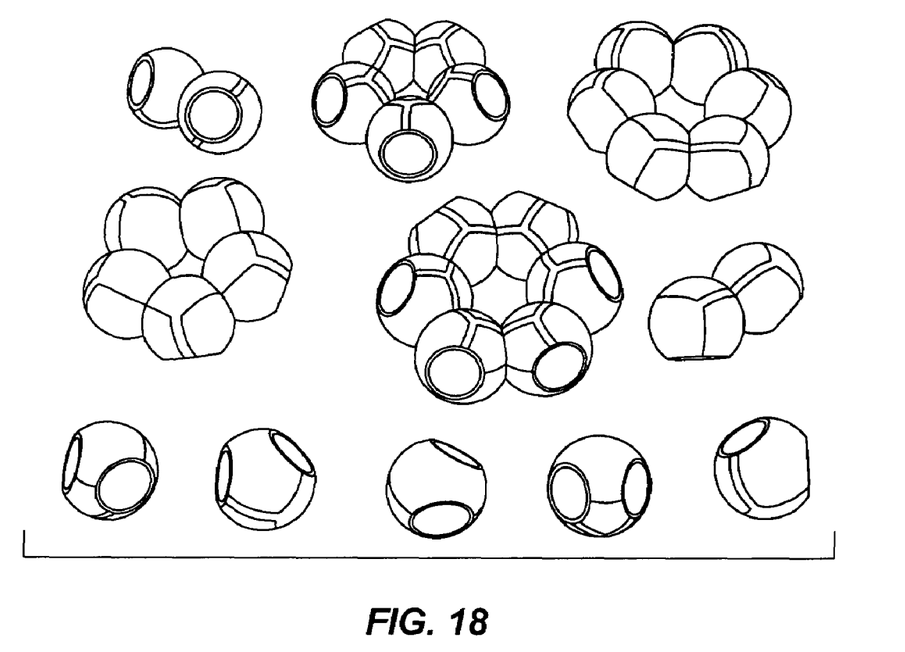
FIG. 18 illustrates a collection of hexamers, pentamers, dimers, and monomers of carbon formed using a molecular model kit similar to the molecular model kit utilized to form the buckyball molecular model of FIG. 3.

Each molecular model is formed of a plurality of three-dimensional bodies. Each three-dimensional body is representative of at least one atom. In some constructions, the three-dimensional body can be representative of a group of atoms or a molecule (e.g., an OH molecule of the propanol molecular model illustrated in FIG. 2). Molecular modeling kits according to the invention can include three-dimensional bodies representing single atoms, three-dimensional bodies representing atom assemblies or molecules, and/or a combination thereof (e.g., a portion of the molecular modeling kit utilized to construct the buckyball molecular model of FIG. 3 is shown in FIG. 18, such a molecular modeling kit could include three-dimensional bodies representing, among other things, hexamers, pentamers, dimers, and monomers utilized to construct the buckyball molecular model). In some constructions, the types of three-dimensional bodies included in the molecular modeling kit may be based on the intended learning objectives to the user of the molecular modeling kit.

Figure 10:
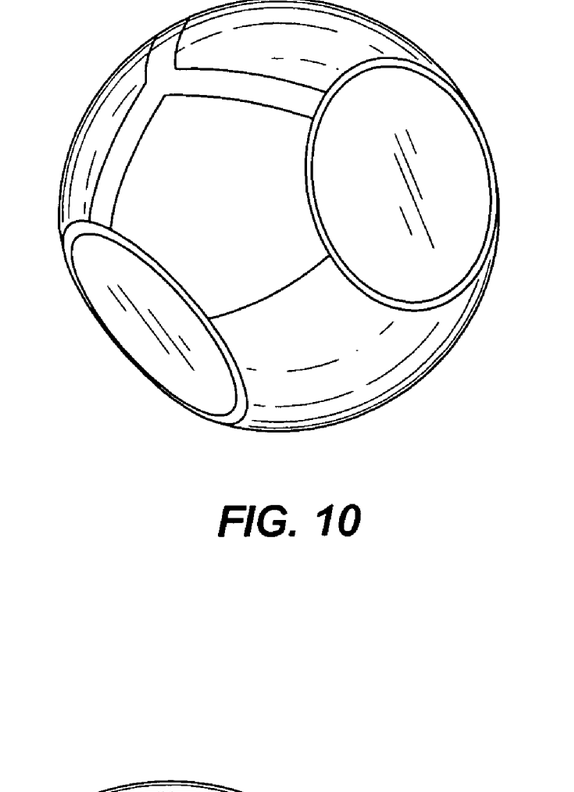
FIG. 10 illustrates a carbon atom model of the buckyball molecular model of FIG. 3.
Figure 11:
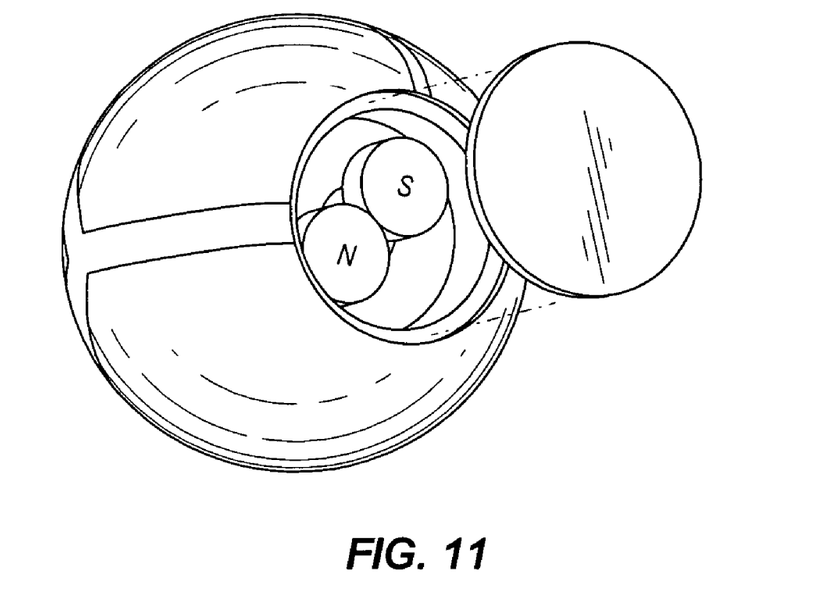
FIG. 11 illustrates a partially exploded atom model.

A three-dimensional body representative of a single atom is illustrated in FIG. 10. Although the three-dimensional body is illustrated as a spheroid, it should be understood that three-dimensional bodies can be alternatively sized and/or shaped in other constructions. With reference to FIG. 10, the three-dimensional body includes an outer surface having a plurality of planar surfaces or facets. FIG. 11 illustrates a three-dimensional body having the planar surface exploded off to reveal an internal fastener. The internal fastener is disposed in a cavity defined in the three-dimensional body. In some constructions, the inner walls of the cavity function as a portion of the internal fastener. In other constructions, the internal fastener can include a chamber having an outer surface that is substantially similar to the inner surface of the cavity.

The planar surface is formed on a cap that is utilized to enclose the internal cavity. In other constructions, the cavity can be alternatively defined. The illustrated internal fastener forms part of a fastening system that is utilized to connect a respective three-dimensional body with other compatible three-dimensional bodies without the use of external pieces. However, in some construction, molecular models formed using molecular modeling kits according to the invention can include a plurality of three-dimensional bodies that are connected using a combination of internal and external fastening systems.

In the illustrated constructions, each three-dimensional body is configured to connect to a number of three-dimensional bodies that is equal to the number of planar surfaces on the respective three-dimensional body. In other constructions, the number of connections and the shape of the connection surface can vary. Further, the points of connection of the illustrated three-dimensional bodies are indicated by the connection surfaces. In this respect, the connection surfaces serve to establish the correct geometry (e.g., a 120 degree angle) between compatible three-dimensional bodies that are coupled together. That is, the connection surfaces are formed so mating compatible three-dimensional bodies form a specific bong angle. The bond angle generally mimics the bond angle of the actual molecular structure the three-dimensional bodies are representing. In other constructions, the location of connection and/or the angle of connection can vary. For example, in some constructions, the planar surface can be eliminated and the point of connection defined on another connection surface of the three-dimensional body (e.g., a rounded surface of the three-dimensional body). In constructions where the shape of the three-dimensional body does not indicate the point of connection, markings can be utilized to key the user to such location. As discussed further below, the intuitive nature of assembly of the molecular models adds to the ability of the user to better understand the molecular structure.

The illustrated planar surfaces and internal fastening systems are utilized to define a single connection angle (e.g., 120 degrees) between the respective three-dimensional body and a compatible three-dimensional body. Therefore, a number of three-dimensional bodies having variously oriented planar surfaces and internal fastening systems may be required to form connections having different bonding geometry. For example, a molecular modeling kit according to the invention may include a first three-dimensional body to represent a carbon atom that connects to compatible three-dimensional bodies at a 120 degree bonding angle and a second three-dimensional body to represent a carbon atom that connects to compatible three-dimensional bodies at a 180 degree bonding angle.

In other constructions, the connection surfaces and the internal fastening systems can be configured to connect the respective three-dimensional body to differing types of compatible three-dimensional bodies. That is, for example, instead of only allowing for connection of the respective three-dimensional body to compatible three-dimensional bodies at an angle of 120 degrees, the internal fastening system can allow for connection of the respective three-dimensional body to compatible three-dimensional bodies at two or more connection angles (e.g., 120 degrees and 180 degrees). Such flexibility in the bonding arrangement more accurately reflects the way that atoms behave in molecules and crystalline materials. However, the ability of a single three-dimensional body to establish multiple bonding geometries may depend on the educational objectives of the molecular modeling kit.

Generally, the three-dimensional body includes at least one internal fastener for each potential connection to other three-dimensional bodies. The internal fasteners can include at least one self-reorienting magnet. Each self-reorienting magnet can be positioned relative to the connection surface of the respective three-dimensional body to achieve accurate bond geometry when the respective three-dimensional body bonds with other three-dimensional bodies.

Each self-reorienting magnet can be positioned at least partially in a cavity of the three-dimensional body. When in proximity with a magnet (e.g., another self-reorienting magnet, a simple magnet such as a stationary magnet, and the like) of another three-dimensional body, the self-reorienting magnet can realign within the cavity such that the magnetic poles of the magnets align for attraction. The self-reorienting magnet can realign by flipping, spinning, and the like. The proximity required between the magnets can depend on a number of factors (e.g., the magnetic field of each magnet). In some constructions, attraction occurs when compatible three-dimensional bodies are spaced by approximately seven millimeters. In other constructions, the spacing may be greater or less. Attraction of the magnets generally results in spontaneous connection of compatible three-dimensional bodies at the respective connection surfaces with accurate bond geometry.

Attaching three-dimensional bodies using an internal fastening system having at least one self-reorienting magnet requires very little motor ability from the user which renders the molecular modeling kits useful for broader range of people with differing fine motor skill abilities. Once the three-dimensional bodies are brought into proximity of each other, fastening occurs with little or no effort by the user. In some constructions, coupling of three-dimensional bodies can produce a clicking or other audible sound. Such sound further demonstrates to the user that a bond has formed.

In addition to the ease of assembly provided by the internal fasteners of the invention, users can also easily disassemble portions of the molecular model to obtain a better understanding of the component parts thereof. For example, a user could disassemble the graphite molecular models shown in FIGS. 8 and 9 into a number of graphene sheet molecular models as shown in FIG. 7. Such disassemble can provide a user a better understanding of how graphite is formed. Further, with reference to FIGS. 14-17, the buckyball molecular model can be split in half and utilized as a template to form the carbon nanotube molecular model of FIG. 1. Such interaction between molecular models can allow users to better understand similarities and/or differences between various molecular models.

A single three-dimensional body can include any number of internal fasteners. Further, a single three-dimensional body can include various types of internal fasteners (e.g., a first internal fastener that includes a stationary magnet, a second internal fastener that includes a self-reorienting magnet that flips to realign, and a third self-reorienting magnet that spins to realign). In some constructions, the internal fastener must be spaced or otherwise configured to prevent unintended interaction between numerous internal fasteners of a single three-dimensional body.

FIG. 11 illustrates a three-dimensional body that includes an internal fastener having first and second self-reorienting magnets (e.g., neodymium disk magnets having north and south poles oriented on opposite faces). The magnets are positioned in a cavity of the three-dimensional body with opposite poles oriented outward. The magnets are attracted to each other through their respective edge surfaces. The illustrated cavity is sized just large enough to allow for the free spinning of the magnets (i.e., the cavity has an inner diameter sized slightly greater than the combined diameters of the magnets and a height that constrains non-spinning movement of the magnets). In other constructions, the magnets and/or the cavity can be alternatively shaped to reduce friction between the magnets and the inner walls of the chamber.

Figure 12:
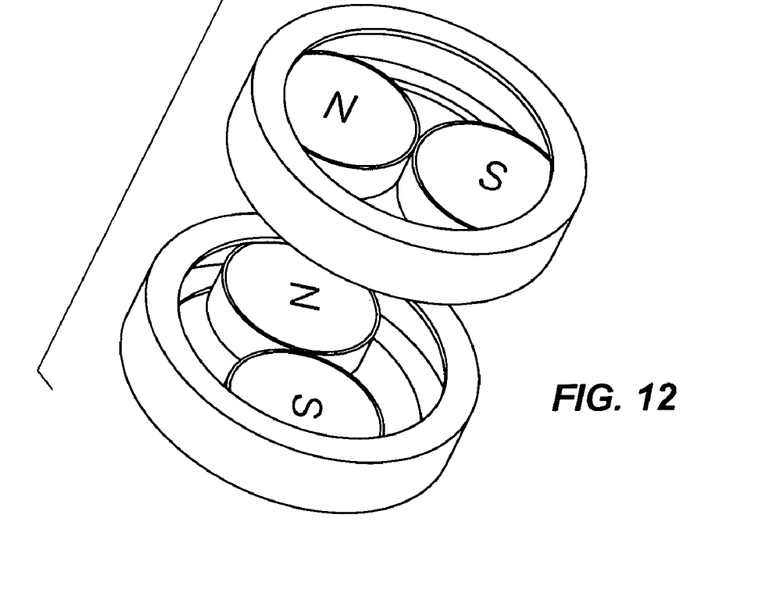
FIG. 12 illustrates spinning self-reorienting arrangements of magnets for use in compatible three-dimensional bodies.

FIG. 12 illustrates how internal fasteners similar to the internal fastener of FIG. 11 can interact to couple two compatible three-dimensional bodies. When the two three-dimensional bodies comprising the internal fasteners of FIG. 12 are brought into close proximity, the encapsulated magnets automatically reorient themselves by spinning about a center of the cavity such that north and south poles of the first magnet pair attract to the south and north poles, respectively, of the second magnet pair (FIG. 12 illustrates the magnet pairs during the realignment process, not aligned). The attractive forces between the magnet pairs cause the three-dimensional bodies to contact and stay together at their respective connection surfaces. This interaction simulates the spontaneous nature of bonding. That is, the three-dimensional bodies spontaneously couple when properly orientated. Therefore, a forcible connection of the three-dimensional bodies using external pieces is not required.

Figure 13:
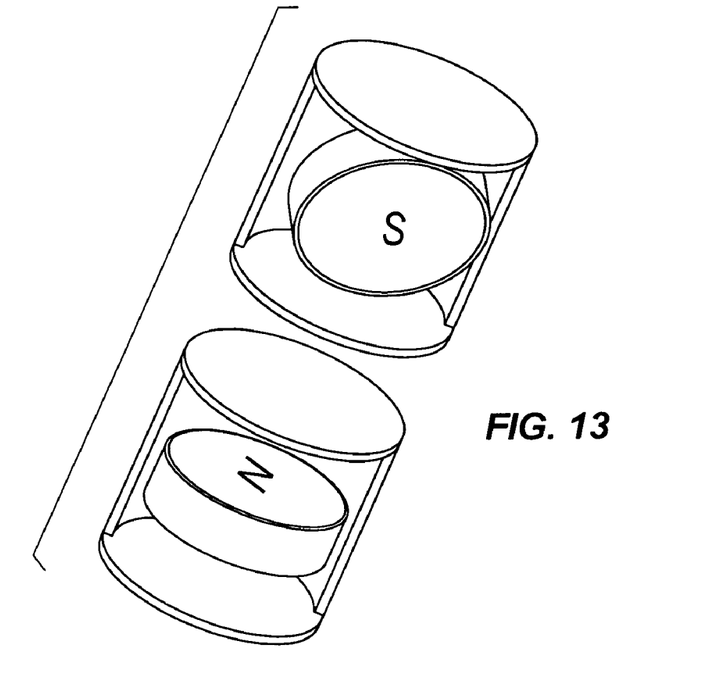
FIG. 13 illustrates flipping self-reorienting arrangements of magnets for use in compatible three-dimensional bodies.
Figure 14:
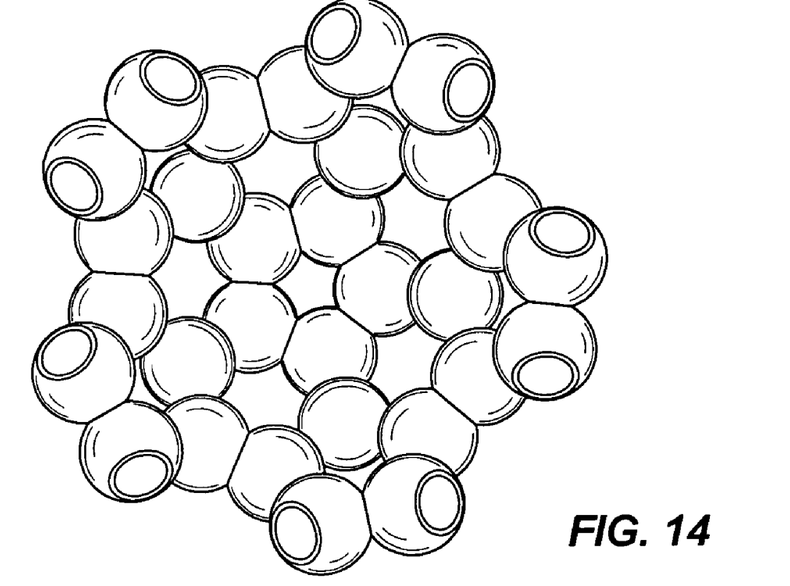
FIG. 14 illustrates a portion of the buckyball molecular model of FIG. 3.
Figure 15:
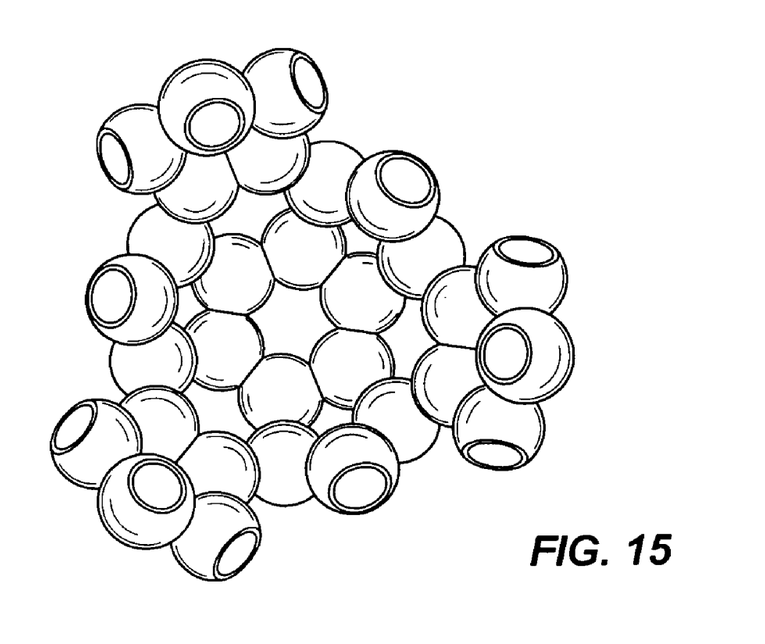
FIG. 15 illustrates a portion of the buckyball molecular model of FIG. 3.
Figure 16:
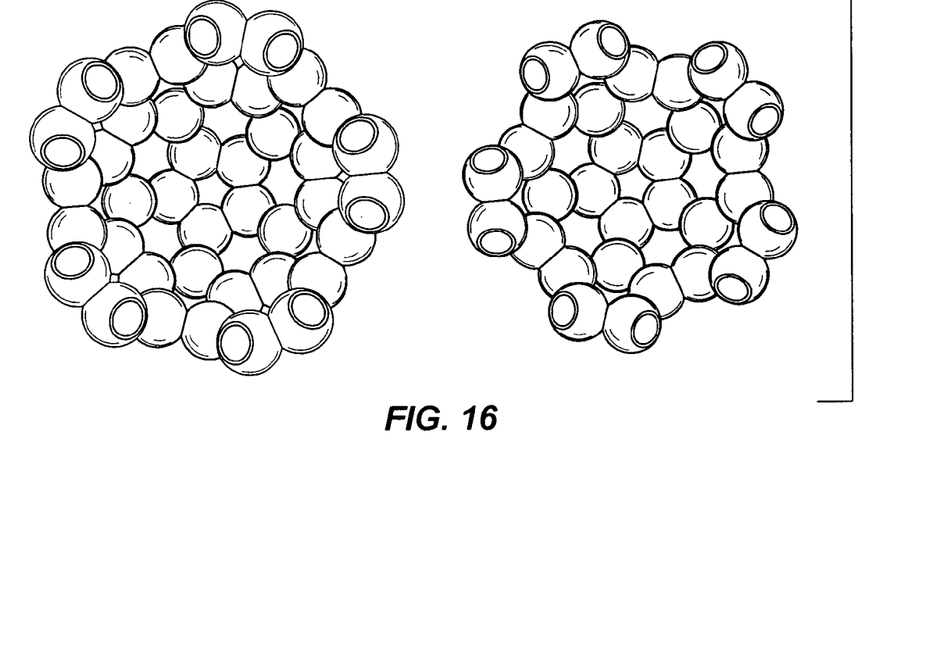
FIG. 16 illustrates use of the portions of the buckyball molecular model of FIGS. 14 and 15 as a template for construction of the carbon nanotube of FIG. 1.
Figure 17:
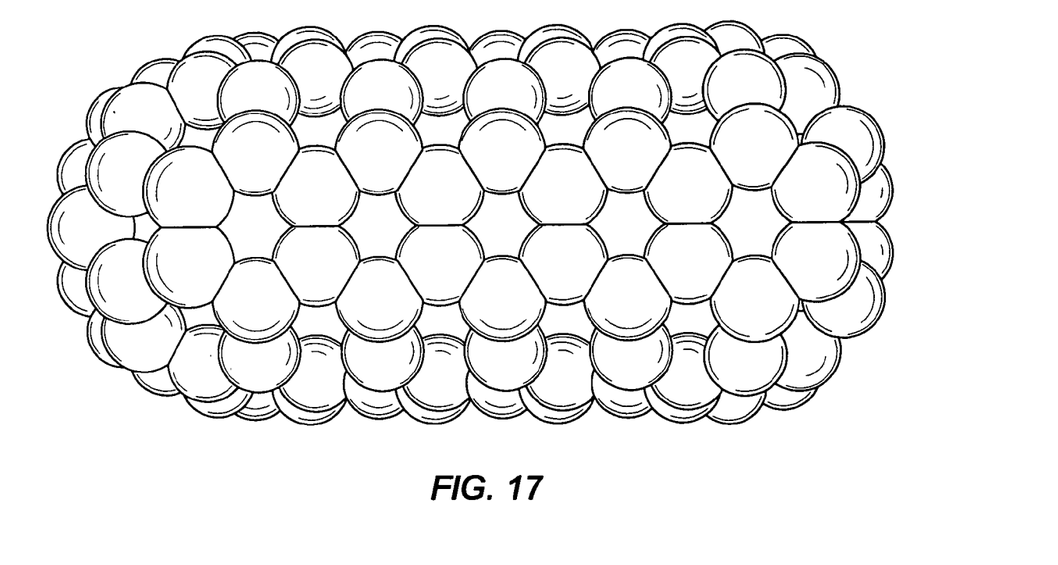
FIG. 17 illustrates use of the portions of the buckyball molecular model of FIGS. 14 and 15 as a template for construction of the carbon nanotube of FIG. 1.

FIG. 13 illustrates an internal fastening system that includes first and second internal fasteners, each having a single self-reorienting magnet. Similar to the internal fastener shown in FIG. 11, the internal fasteners of FIG. 13 are positioned in a cavity of the three-dimensional body. The illustrated cavity is sized just large enough to allow for the magnets to flip in a defined direction (e.g., the cavity includes an inner diameter and a height sized slightly greater than the diameter of the magnet). When two three-dimensional bodies comprising the internal fasteners of FIG. 13 are brought into close proximity, the encapsulated magnets automatically reorient themselves by flipping in their respective cavities such that, for example, the north pole of the first magnet attracts to the south pole of the second magnet (FIG. 13 illustrates the magnets during the realignment process, not aligned). The attractive forces between the magnets cause the three-dimensional bodies to contact and stay together at their respective connection surfaces. This interaction also simulates the spontaneous nature of bonding.

In other constructions, internal fasteners can include self-reorienting magnets that alternatively realign when proximal to another magnet. For example, the magnet can utilize any combination of spinning, flipping, translating, and the like to achieve one or more connection angles. In order to accomplish such realignment, the inner walls of the cavity may also be alternatively shaped. The magnets of the internal fasteners shown in FIGS. 11-13 can be disposed directly in the cavity or disposed in a chamber, which is disposed in the cavity. In some constructions, the use of a separate chamber can depend on the manufacturing technique utilized.

As discussed above, each of the molecular models illustrated in FIGS. 1-9 include a plurality of three-dimensional bodies. In some constructions, the three-dimensional bodies can be assembled using instructions provided with the molecular modeling kits. In other construction, the three-dimensional bodies can include various patterns and/or coloration that allow for the intuitive assembly of the three-dimensional bodies to form molecular models. Use of coloration and/or patterns can allow the user to manipulating the molecular models to discover the structure, rather than simply reproduce the structure from a set of instructions.

In some construction, the three-dimensional bodies include a single coloration to signify that the three-dimensional body should be connected to other three-dimensional bodies having a similar coloration. Often, such assembly results in a molecular model of a crystalline material (e.g., see the diamond molecular models of FIGS. 4-6). In other constructions, three-dimensional bodies of a single color can be combined to form various portions of a molecular mode (e.g., see the carbon nanotube molecular model of FIG. 1 that includes a number of carbon ring, each being formed of three-dimensional bodies of a single color). With reference to FIGS. 4-6, although the three-dimensional bodies generally include a single color, the connecting portions of the three-dimensional body can be alternatively colored for ready reference by the user.

In other constructions, the three-dimensional bodies can include a more complex coloration to signify the connection scheme. For example, FIG. 18 illustrates a plurality of three-dimensional bodies utilized to form the buckyball molecular model of FIG. 3. The illustrated buckyball molecular model is formed using sixty identical three-dimensional bodies. These three-dimensional bodies include coloration and patterns which allow the user to intuitively assembly the molecular model.

Figure 19:
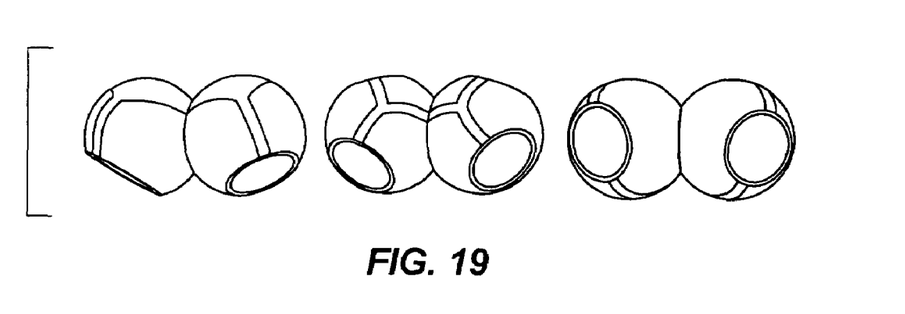
FIG. 19 illustrates proper connections between atom models of FIG. 18.
Figure 20:
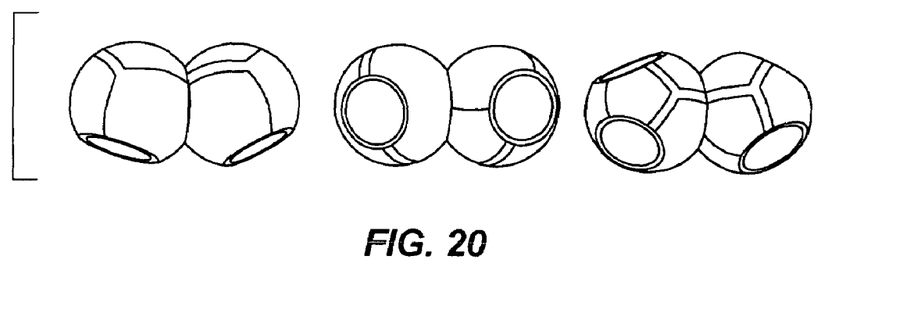
FIG. 20 illustrates improper connections between atom models of FIG. 18.

When the three-dimensional bodies are properly connected, an evident pattern results (see FIG. 19 which shows various correct assemblies of three-dimensional bodies). When the three-dimensional bodies are improperly connected, no pattern results (see FIG. 20 which shows various incorrect assemblies of three-dimensional bodies). A user can continue to assembly the three-dimensional bodies until an entire molecular model is assembled.

The illustrated color scheme of the buckyball molecular model is designed so a majority of the patterns necessary for assembly purposes face the interior of the buckyball molecular model when assembled. The color scheme is further designed so the exterior coloration highlights the symmetry of the molecule by coloring the formed hexagons differently from the pentagons (see FIG. 3). Such coloration can be useful not only for assembly purposes, but also for educational purposes once the molecular model is complete.

The three-dimensional bodies can be constructed using any number of different manufacturing techniques (e.g., rapid prototyping, plaster molding, injection molding, and the like). In some constructions, coloration of the three-dimensional bodies and/or placement of the internal fasteners can be an integral portion of the manufacturing process. In other constructions, coloration of the three-dimensional bodies and/or placement of the internal fasteners can be a secondary operation.

Various features and aspects of the invention are set forth in the following claims.

What is claimed is:

1. A molecular modeling kit comprising:
   at least one spheroid providing a physical representation of at least one atom, the at least one spheroid comprising an outer surface having at least one substantially flat surface providing a physical representation of a bonding site, the at least one spheroid defining a cavity, and the outer surface including a pattern defining assembly instructions for proper connection to a second magnet, and
   a self-reorienting magnet being at least partially disposed in the cavity and being configured to realign relative to the cavity when in proximity with the second magnet such that magnetic poles of the self-reorienting magnet and the second magnet are aligned for attraction, the second magnet being external to the at least one spheroid.

2. A molecular modeling kit according to claim 1 wherein the self-reorienting magnet realigns by spinning relative to the cavity.

3. A molecular modeling kit according to claim 1 wherein the self-reorienting magnet realigns by flipping relative to the cavity.

4. A molecular modeling kit according to claim 1 wherein the self-reorienting magnet is entirely disposed in the cavity.

5. A molecular modeling kit according to claim 1 and further comprising a three-dimensional body, wherein the three-dimensional body provides a physical representation of at least one atom, and wherein the three-dimensional body comprises the second magnet.

6. A molecular modeling kit according to claim 1 wherein the at least one spheroid and the three-dimensional body each provide a physical representation of the same at least one atom.

7. A molecular modeling kit according to claim 1 wherein the cavity is substantially cylindrical in shape.

8. A molecular modeling kit according to claim 1 wherein the at least one spheroid further comprises a second self-reorienting magnet, the second self-reorienting magnet being at least partially disposed in the cavity.

9. A molecular model according to claim 5 wherein the three-dimensional body also comprises a spheroid.

10. A molecular modeling kit comprising:
    a first spheroid providing a physical representation of at least one atom, the first spheroid including an outer surface having a first substantially flat surface providing a physical representation of a first bonding site, the outer surface including a first pattern, the spheroid comprising a first magnet,
    a second spheroid providing a physical representation of at least one atom, the second spheroid including an outer surface having a second substantially flat surface providing a physical representation of a second bonding site, the outer surface including a second pattern, the first pattern and the second pattern defining an assembly instruction for connection of the first spheroid and the second spheroid, the second spheroid defining a cavity and comprising a second magnet, the second magnet comprising a self-reorienting magnet, the self-reorienting magnet being at least partially disposed in the cavity and being configured to realign relative to the cavity when in proximity with the first magnet such that magnetic poles of the first magnet and the second magnet are aligned for attraction, the first bonding site of the first spheroid spontaneously connecting to the second bonding site of the second spheroid when the first magnet and the second magnet are aligned for attraction.

11. A molecular modeling kit according to claim 10 wherein the first magnet comprises a stationary magnet.

12. A molecular modeling kit according to claim 10 wherein the first magnet comprises a self-reorienting magnet.

13. A molecular modeling kit according to claim 10 wherein the first outer surface and the second outer surface comprise a substantially similar color scheme.

14. A molecular modeling kit according to claim 13 wherein the color scheme comprises at least two colors.

15. A molecular modeling kit according to claim 14 wherein one of the at least two colors defines connection surfaces on the first and second outer surfaces.

16. A molecular modeling kit according to claim 13 wherein the first outer surface defines a first connection surface, wherein the second outer surface defines a second connection surface, and wherein the first connection surface and the second connection surface contact when the first spheroid is connected to the second spheroid.

17. A molecular modeling kit according to claim 10 wherein the first and second connection surfaces each comprise a planar surface.

18. A molecular modeling kit comprising:
 a three-dimensional body providing a physical representation of at least one molecule, the three-dimensional body including a first spheroid connected to at least a second spheroid, the first spheroid including an outer surface having a defined pattern, the second spheroid including an outer surface having a defined pattern, and wherein the three-dimensional body includes an overall pattern indicating proper connection between the first spheroid and the second spheroid; and
 at least one of the first spheroid and the second spheroid including a substantially flat bonding surface, a cavity, and a self-reorienting magnet, the self-reorienting magnet being at least partially disposed in the cavity and being configured to realign relative to the cavity when in proximity with a second magnet so that magnetic poles of the self-reorienting magnet and the second magnet are aligned for attraction, the second magnet being external to the three-dimensional body.

19. A molecular modeling kit according to claim 18 wherein the self-reorienting magnet realigns by spinning relative to the cavity.

20. A molecular modeling kit according to claim 18 wherein the self-reorienting magnet realigns by flipping relative to the cavity.

21. A molecular modeling kit according to claim 18 wherein the self-reorienting magnet is entirely disposed in the cavity.

22. A molecular modeling kit according to claim 18 and further comprising a second three-dimensional body, wherein the second three-dimensional body provides a physical representation of at least one atom, and wherein the second three-dimensional body includes the second magnet.

23. A molecular modeling kit according to claim 18 and further comprising a second three-dimensional body, wherein the second three-dimensional body provides a physical representation of at least one molecule, and wherein the second three-dimensional body includes the second magnet.

24. A molecular modeling kit according to claim 23 wherein the second three-dimensional body comprises a plurality of spheroids.

25. A molecular modeling kit according to claim 18 wherein the cavity is substantially cylindrical in shape.

26. A molecular modeling kit according to claim 18 wherein the three-dimensional body further comprises a second self-reorienting magnet, the second self-reorienting magnet being at least partially disposed in the cavity.

* * * * *